(12) United States Patent
Kalina et al.

(10) Patent No.: US 6,237,733 B1
(45) Date of Patent: May 29, 2001

(54) INTERNAL NEUTRAL POSITIONING SPRING FOR RAILCAR SHOCK ABSORBER

(75) Inventors: Harry B. Kalina, Arlington; Charles T. Bomgardner, Burleson; Richard N. Hodges, Arlington, all of TX (US)

(73) Assignee: FM Industries, Inc., Fort Worth, TX (US)

( * ) Notice: Subject to any disclaimer, the term of this patent is extended or adjusted under 35 U.S.C. 154(b) by 0 days.

(21) Appl. No.: 09/123,640

(22) Filed: Jul. 28, 1998

(51) Int. Cl.[7] ................................ B60G 15/10
(52) U.S. Cl. .......................... 188/315; 267/226
(58) Field of Search .................. 188/314, 315; 267/226, 219, 35, 220

(56) References Cited

U.S. PATENT DOCUMENTS

| | | | |
|---|---|---|---|
| 3,111,201 | * 11/1963 | Bliven | 267/226 |
| 3,211,442 | * 10/1965 | Auner | 267/226 |
| 3,722,639 | * 3/1973 | Keijzer et al. | 188/315 |
| 3,860,098 | * 1/1975 | Porter et al. | 188/315 |
| 3,958,673 | * 5/1976 | Allinquant et al. | 188/315 |
| 4,960,188 | * 10/1990 | Wossner | 188/315 |
| 5,265,710 | * 11/1993 | Gabas et al. | 267/226 |
| 5,325,942 | * 7/1994 | Groves et al. | 188/315 |
| 5,501,438 | * 3/1996 | Handke et al. | 267/226 |
| 5,570,763 | * 11/1996 | Parejo | 188/315 |
| 5,642,823 | 7/1997 | Kalina et al. | 188/315 |

OTHER PUBLICATIONS

Article from Railway Age; Jul. 1998.

* cited by examiner

*Primary Examiner*—Matthew C. Graham
(74) *Attorney, Agent, or Firm*—Felsman, Bradley, Vaden, Gunter & Dillon, L.L.P.; James E. Bradley

(57) ABSTRACT

A cushioning device for a railcar coupling that operates at a very high impedance when subjected to low level forces to thereby reduce the effect of slack between railcars while still providing an effective cushion for absorbing high levels of shock between the railcars. The cushioning device includes a cylinder containing a fluid of liquid and a gas under pressure for absorbing shock due to buff and draft movement and a piston carried in the cylinder. The gas pressure urges the piston toward the draft end of the cylinder while restoring from a buff shock. An internal positioning spring stops further restoring movement of the piston toward the draft end of the cylinder at a selected neutral position spaced from the draft end of the cylinder. The internal positioning spring allows the piston to move from the neutral position toward the draft end of the cylinder if a draft shock occurs of sufficient magnitude while the piston is in the neutral position.

20 Claims, 2 Drawing Sheets

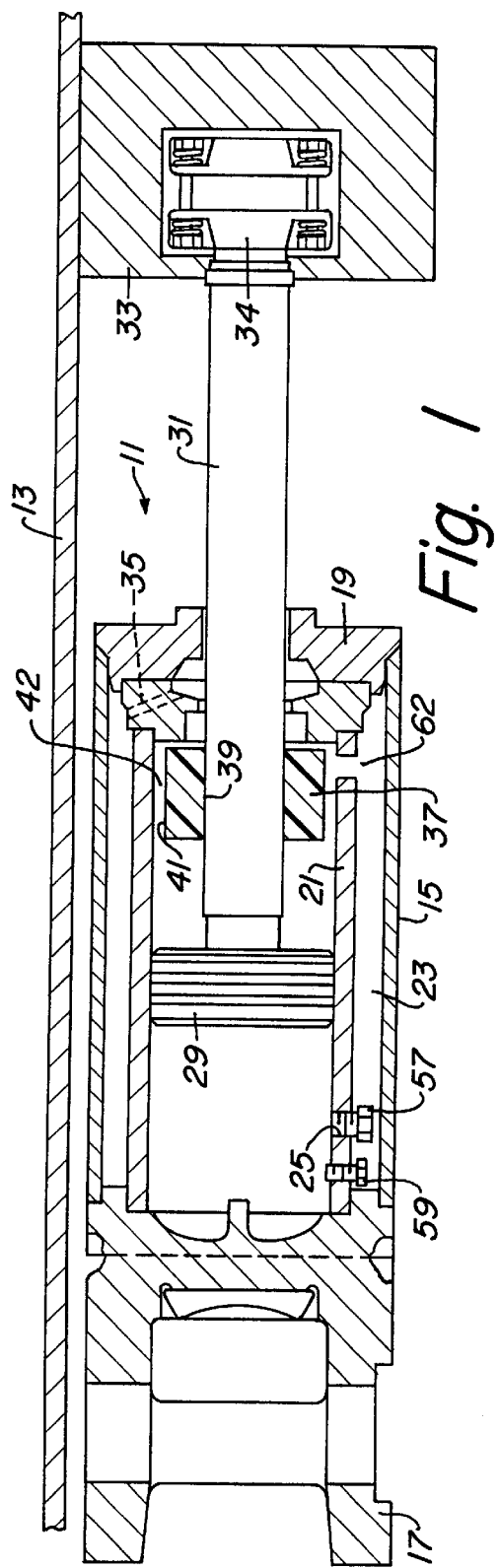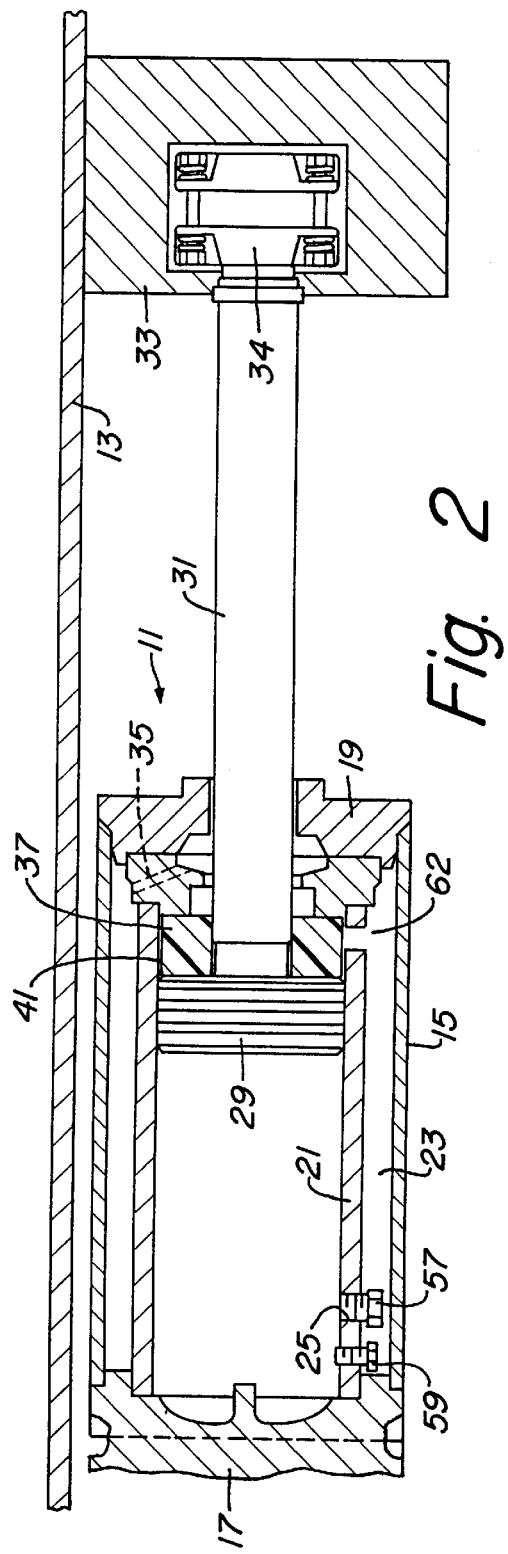

INTERNAL NEUTRAL POSITIONING SPRING FOR RAILCAR SHOCK ABSORBER

TECHNICAL FIELD

This invention relates in general to railcar cushioning devices, in particular to a railcar cushioning device which is responsive from a neutral position to both buff and draft forces.

BACKGROUND ART

Railcars experience a great deal of shock during coupling operations and other train action which can damage cargo on the railcars and the railcars themselves. To absorb the high forces experienced by railcars during these operations, cushioning devices have been employed between the frame of the railcar and its coupler.

The shock experienced by railcars results from both buff and draft forces applied to the coupler of the railcar. The term "buff" is used to describe the movement experienced by a coupler when it is moved towards its associated railcar. These buff forces are usually experienced during coupling operations between the railcars. "Draft" describes the outward movement of the coupler away from its associated railcar in response to pulling forces acting on the coupler.

These cushioning devices are usually hydraulic piston and cylinder arrangements which absorb both buff and draft forces. The cylinders are filled with a hydraulic fluid which is forced through ports in the cylinder wall in response to the impact force applied to the piston. Characteristic of these cushioning devices, however, is the low level of impedance they provide in response to very low buff and draft forces. This response to very low buff and draft forces creates the undesirable effect of "slack" between the railcars.

There is a need therefore for a cushioning device for a railcar that operates at a very high impedance when subjected to low level forces to thereby reduce the effect of slack between the railcars while still providing an effective cushion for absorbing high levels of shock between the railcars.

In addition, related art shock absorbers, when not undergoing shock, will restore the piston and shock absorber to an extended position. The restoration occurs due to gas pressure in the cylinder pushing the piston to the extended position. If a draft shock occurs while the piston is in the full extended position, the shock absorber will not be able to accommodate the draft shock because the railcar pocket stops mechanically prohibit further extension movement.

SUMMARY OF THE INVENTION

The cushioning device of this invention has a neutral position for the piston. In the neutral position, the piston is located at an intermediate position, spaced between the buff and draft ends of the cylinder. If a buff shock occurs while in the neutral position, the piston and cylinder move relative to each other, with the piston moving towards the buff end to absorb the shock. Liquid in the cylinder passes through ports into the reservoir during this movement. Preferably, pressure relief valves will be located in at least some of the ports for requiring a minimum pressure before movement of the piston can occur. If a draft movement occurs, the piston will move toward the draft end of the cylinder, also absorbing shock.

To provide the neutral position, a spring is employed within the cylinder. The spring allows free restoration of the piston until the piston reaches the neutral position. Upon reaching the neutral position, any continued movement of the piston towards the draft end of the cylinder must further compress the spring. The spring force is selected to be greater than the force being exerted by gas pressure on the piston during restoration. Therefore, the spring force stops the piston at the neutral position. If a draft shock occurs while the piston is in the neutral position, the piston will further compress the spring.

In the preferred embodiment, a spring is mounted inside the cylinder. The cylinder has a buff end and a draft end and contains a fluid comprising liquid and gas for absorbing shock due to buff and draft movement. A piston carried inside of the cylinder is urged toward the draft end of the cylinder. Either the piston or the cylinder is adapted to be secured to a coupling for coupling to adjacent railcars. The internal positioning spring is provided for stopping further restoring movement of the piston toward the draft end of the cylinder at a selected neutral position spaced from the draft end of the cylinder. However, the spring allows the piston to move from the neutral position toward the draft end of the cylinder if a draft shock occurs of sufficient magnitude while the piston is in the neutral position.

BRIEF DESCRIPTION OF THE DRAWINGS

FIG. 1 is a vertical sectional view, partially schematic, illustrating a railcar shock absorber constructed in accordance with this invention.

FIG. 2 is a sectional view of the shock absorber of FIG. 1, shown in a fully extended or draft position.

BEST MODES FOR CARRYING OUT THE INVENTION

Figure 3:
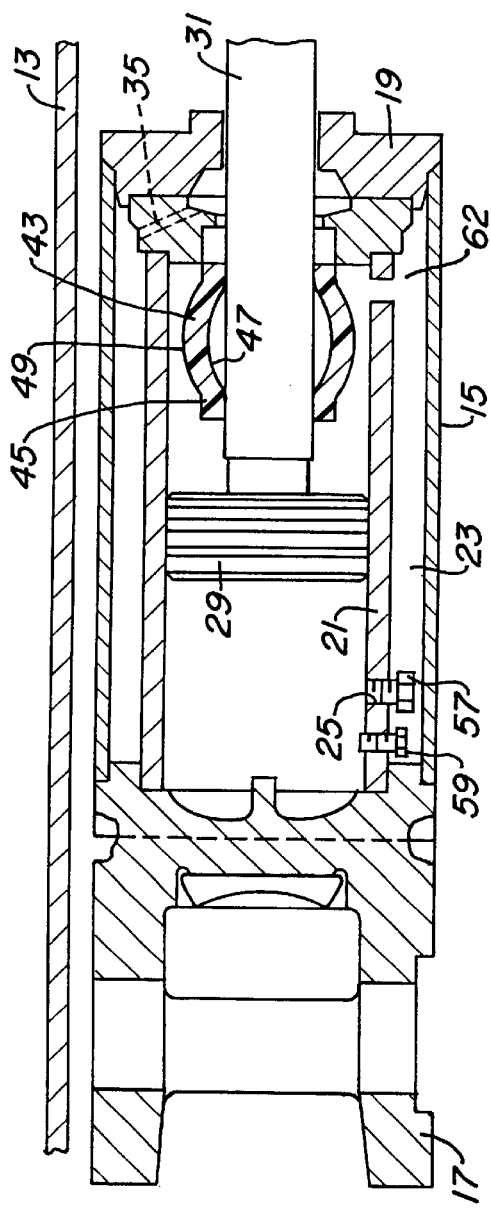
FIG. 3 is a sectional view of the shock absorber of FIG. 1, shown with a first alternate embodiment of a spring member.

Referring to FIG. 1, shock absorber 11 is a type to be installed in a railcar having a center sill or frame 13. In the embodiment of FIGS. 1–4, shock absorber 11 has a cylinder housing 15 that moves relative to frame 13. Cylinder housing 15 has a coupling end 17 that is secured to a conventional railcar coupling. A cylinder head plate 19 locates at the other end of cylinder housing 15. A pocket stop (not shown) is welded to frame 13 in a position to be contacted by coupling end 17 and stop movement of cylinder housing 15 when it has moved to a maximum draft position.

An inner cylinder 21 is carried within cylinder housing 15. An annular clearance between inner cylinder 21 and housing 15 serves as a reservoir 23. A plurality of ports 25 are located in the side wall of cylinder 21 for communicating oil and gas between reservoir 23 and the interior of cylinder 21.

A piston 29 is located within cylinder 21 for relative reciprocating movement. Piston 29 has a piston shaft 31 that extends outward through head plate 19. In the embodiments of FIGS. 1–4, piston shaft 31 has a flange 34 on its end which is secured to a brace or backstop 33, which is welded to a part of a railcar frame 13, such as the center sill shown schematically. For convenience only, piston 29 at times may be considered to move while the cylinder 21 is stationary or vice versa, although the movement is actually a relative movement between the cylinder 21 and piston 29. Piston 29 is in a maximum draft position in FIG. 2. When in a full buff position (not shown), the exterior side of cylinder head plate 19 will contact backstop 33 and piston 29 will be closely spaced to but not touching coupling end 17. A return flow passage 35 communicates fluid from reservoir 23 back to the cylinder 21 on the shaft side of piston 29 when piston 29 moves toward coupling end 17 relative to cylinder 21.

A spring member 37 is located within cylinder 21 between head plate 19 and piston 29. In the embodiment of FIGS. 1 and 2, spring member 37 is a solid annular elastomeric member of rubber or other suitable material. Spring member 37 has a passage 39 through it for receiving piston shaft 31. Spring member 37 has an outer diameter 41 that is cylindrical and is spaced inward from the inner diameter of cylinder 21, creating an annular clearance 42. Clearance 42 accommodates portions of spring member 37 when it is deformed under a draft movement as shown in FIG. 2.

In the operation of the embodiment of FIGS. 1 and 2, oil and pressurized gas fill cylinder 21 and reservoir 23. In the absence of a buff or draft force, the internal pressure of the gas will gradually restore piston 29 to a fully extended position. In the fully restored position, piston 29 will contact one side of spring member 37, while the other side of spring member 37 will be in abutment with head plate 19. The hardness of spring member 37 is selected so that the gas pressure will cause only slight deformation of spring member 37 while in the fully restored position. In one example, the stiffness of spring member 37 is in the range from 70–100 durometer and the deflection of spring member 37 under gas pressure is in the range from 0.1 to 1.0 inch, and typically about 0.3 inch. The neutral or fully restored position, as referred to herein, is the condition wherein the gas pressure on piston 29 is opposed by an equal and opposite force due to slight deflection of spring member 37.

While in the neutral position, if a significant draft force occurs, head plate 19 and piston 29 will move further toward each other, deforming spring member 37. If the draft force is sufficiently high, spring member 37 will contract in longitudinal length significantly and deform radially outward into contact with the inner diameter of cylinder 21 as shown in FIG. 2. Preferably, the annular clearance 42 is made sufficiently large to accommodate at least 2" of longitudinal deformation of spring member 37. In one embodiment, clearance 42 is about ½" on a side. Spring member 37 will absorb some of the draft shock during deformation, but primarily the draft shock is absorbed by hydraulic dampening. After the draft shock has occurred, the resiliency of spring member 37 restores piston 29 back to the neutral position. During restoration, spring member 37 will return back to its natural dimension shown in FIG. 1. If a buff shock occurs while piston 29 is in the neutral position, piston 29 and coupling end 17 will move toward each other with the shock being absorbed by the oil within the cylinder 21 being forced out ports 25. Spring 37 is inactive during this buff shock. Also, spring member 37 is not affected by draft shocks which occur before further restoration, unless the shocks are large enough to compress spring 37 between piston 29 and head plate 19. Spring member 37 may be secured to head plate 19, or it may be secured to piston 29 for movement therewith, or it may be free to float on shaft 31 between piston 29 and head plate 19. During the buff and draft shocks, the internal fluid will flow between cylinder 21 and reservoir 23 through the various ports 25 and return passage 35.

Referring to FIG. 3, this embodiment operates in the same manner as the embodiments of FIGS. 1 and 2. Spring member 43 in this embodiment is an elastomeric which is a polymer with good elastic characteristics, such as "Hytril", which is a trademark of Dupont. Spring member 43 has neck portions 45 on its opposite ends that fit closely about shaft 31. Spring member 43 has arcuate walls, with an inner surface 47 that is concave and an outer surface 49 that is convex. The wall thickness varies. The maximum outer diameter of outer surface 49 is less than the inner diameter of cylinder 21 while spring member 43 is in its natural position.

Spring member 43 operates in the same manner as spring member 37 of the first embodiment. In the neutral position, piston 29 will abut one end of spring member 43, while the other end will abut head plate 19. A draft force occurring from the neutral position will result in spring member 43 deforming. The longitudinal length of spring member 43 will decrease and the outer diameter will increase until outer surface 49 contacts the inner diameter of cylinder 21. After the draft shock has occurred, the resiliency of spring member 43 causes piston 29 to move back to the neutral position as spring member 43 returns to its natural position.

Figure 4:
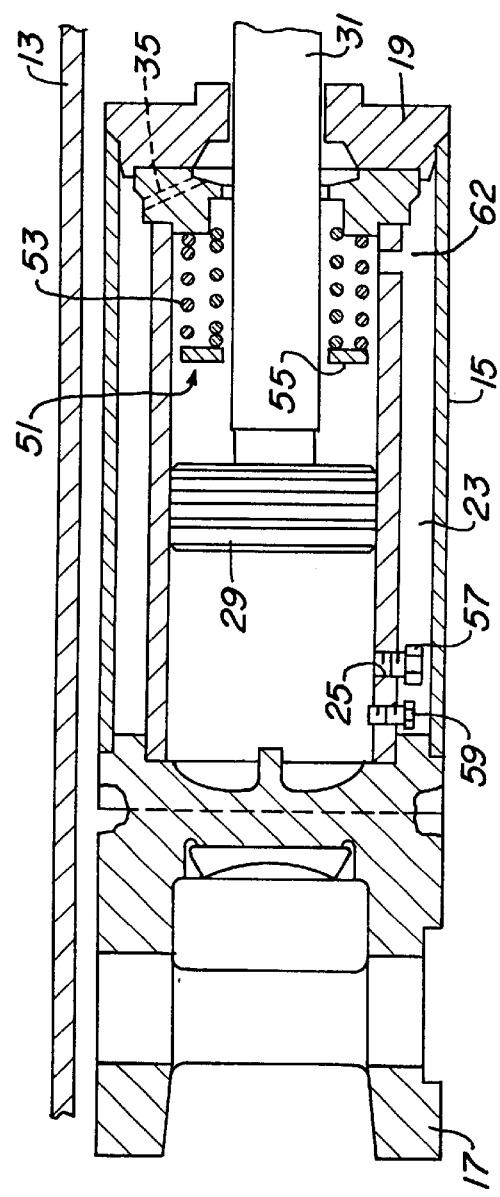
FIG. 4 is a sectional view of the shock absorber of FIG. 1, shown with a second alternate embodiment of a spring member.

In FIG. 4, rather than an elastomer, spring member 51 comprises a plurality of metal coil springs 53. In the embodiment shown, springs 53 are spaced apart from each other circumferentially around shaft 31. The axis of each spring 53 is parallel to and offset from shaft 31. Shaft 31 does not pass through the inner diameter of the springs 53. An end plate or retainer 51 is located on the outer ends of springs 53. Coil springs 53 will be retained with head plate 19 or alternately with piston 29. Optionally, a larger spring which encircles the shaft may be utilized in lieu of coil springs 53.

The operation of the embodiment of FIG. 4 is the same as previously described. Spring member 53 has sufficient force to prevent piston 29 from further restoring due to internal gas pressure, defining a neutral position for piston 29. If a draft shock occurs from the neutral position, springs 53 will deflect, contracting longitudinally and absorbing some of the shock.

The lengths of the springs in each of the embodiments is substantially less than the distance from piston 29 to the draft end while the piston is in full buff position. This assures that buff and draft shocks are absorbed by the oil/gas without any influence of the spring. The spring operates only when a draft shock occurs when the piston is in a neutral position. In each of the embodiments, ports 25 will have various valves so as to require a significant force to occur while in the neutral position before piston 29 and cylinder 21 will move relative to each other. These valves include a number of pressure relief valves 57 (only one shown) which are preset to require a pressure differential between cylinder 21 and reservoir 23 of significant magnitude, such as approximately 1500 psi. Valves 57 will not allow any flow from reservoir 23 back into cylinder 21, but will allow outflow if the pressure differential reaches the selected amount.

There are also several equalizing valves 59 (only one shown). Equalizing valves 59 are check valves of a movable ball type that will allow at a low pressure differential a low flow rate of fluid from reservoir 23 into cylinder 21. If a high pressure differential occurs, such as a buff shock, however, the balls move against the seats and prevent egress from reservoir 23 to cylinder 21. Equalizing valves 59 allow the fluid pressure between cylinder 21 and reservoir 23 to slowly equalize while not undergoing shock. There is also an open restoration port 62, which is located in the wall of cylinder 21 between piston 29 and head plate 19. Restoration port or draft port 62 allows fluid to flow from cylinder 21 on the shaft side of piston 29 back into reservoir 23 during restoration movement for a buff shock.

The invention has significant advantages. The neutral stop allows the shock absorber to handle both draft and buff shocks that may occur from the neutral position. The internal spring allows a neutral position to be employed with a piston and cylinder that utilizes internal gas pressure. The pressure relief valves require a significant minimum force to be applied in both the buff and draft directions before absorbing shock.

While the invention is shown in several of its forms, it should be apparent to those skilled in the art that the invention is not so limited, but is susceptible to various changes without departing from the scope of the invention.

What is claimed is:

1. A railcar shock absorber, comprising in combination:
   a cylinder which has a buff end and a draft end and containing fluid of a liquid and gas under gas pressure for absorbing shock due to buff and draft movement;
   a piston assembly including a piston carried in the cylinder and a piston shaft extending from the piston sealingly through the draft end of the cylinder, the gas pressure urging the piston and the draft end of the cylinder toward each other while restoring from a buff shock;
   one of the piston shaft and the cylinder adapted to be secured stationarily in a horizontal position to a frame of the railcar and the other of the piston shaft and the cylinder adapted to be secured to a coupling for coupling to adjacent railcars; and
   an internal positioning spring located in the cylinder between the piston and the draft end, the spring having one end that engages the piston assembly and another end that engages the draft end of the cylinder while the piston and cylinder are in a neutral position for stopping further restoring movement of the piston and the draft end of the cylinder toward each other at the neutral position, and for allowing the piston and the draft end of the cylinder to move from the neutral position toward each other if a draft shock occurs of sufficient magnitude to deform the spring while the piston is in the neutral position, and at least one of the ends of the spring being free of attachment to the piston assembly and the draft end of the cylinder to allow the piston and the draft end of the cylinder to move away from each other from the neutral position without substantial elongation of the spring if a buff shock occurs of sufficient magnitude.

2. A railcar shock absorber according to claim 1 wherein said internal positioning spring comprises at least one coil spring.

3. A railcar shock absorber according to claim 1 wherein said internal positioning spring comprises a plurality of springs which have axes parallel to and offset from an axis of the shaft.

4. The shock absorber according to claim 1, wherein
   the piston has a face that faces the buff end of the cylinder and in the neutral position, the face of the piston is closer to the draft end of the cylinder than the buff end.

5. The shock absorber according to claim 1 wherein said spring comprises an elastomeric member encircling the shaft, the elastomeric member having an outer diameter that is less than an inner diameter of the cylinder while the elastomeric member is in an undeformed condition.

6. The shock absorber according to claim 1 wherein said spring is an elastomeric member.

7. The shock absorber according to claim 1 wherein said spring is substantially in an undeformed condition while the piston and cylinder are in the neutral position.

8. The shock absorber according to claim 1, wherein the internal positioning spring is an elastomeric sleeve encircling the shaft, having a sidewall which has a concave inner surface with a portion spaced radially from the shaft and a convex outer surface while in an undeformed condition.

9. The railcar shock absorber according to claim 1, further comprising:
   a reservoir extending around the cylinder;
   a plurality of ports in the cylinder for forcing the fluid from the cylinder into the reservoir during buff and draft shock;
   a return passage between the cylinder and the reservoir for returning fluid from the reservoir to the cylinder as the piston and cylinder are restored to the neutral position; and
   a pressure relief valve in at least one of the ports for requiring an initial pressure differential between the cylinder and the reservoir before allowing fluid flow through the pressure relief valve from the cylinder to the reservoir.

10. In a railcar shock absorber having a cylinder which has a buff end and a draft end, a piston assembly including a piston carried in the cylinder and a piston shaft extending from the piston sealingly through the draft end of the cylinder, one of the piston shaft and the cylinder adapted to be secured stationarily in a horizontal position to a frame of the railcar and the other of the piston shaft and the cylinder adapted to be secured to a coupling, and the cylinder containing a liquid and gas fluid under gas pressure for absorbing shock due to buff and draft movement, the gas pressure causing the piston and cylinder to restore toward an extended position, the improvement comprising
   an internal positioning spring comprising an elastomeric member mounted inside of the cylinder between the piston and the draft end of the cylinder, the spring having a length selected so that opposite ends of the spring are engaged by the piston assembly and the draft end of the cylinder at a neutral position during restoration movement, the spring having sufficient stiffness to prevent further restoring movement of the piston and cylinder from the neutral position due to the gas pressure, wherein a draft shock of sufficient magnitude occurring while the piston and the cylinder are in the neutral position causes the piston and the draft end of the cylinder to deform the spring, and a buff shock of sufficient magnitude occurring while the piston and the cylinder are in the neutral position causes the piston and the draft end of the cylinder to move away from each other.

11. The shock absorber according to claim 10, wherein the piston has a face that faces the buff end of the cylinder and is located closer to the draft end than the buff end of the cylinder while in the neutral position.

12. The shock absorber according to claim 10, further comprising:
   a reservoir extending around the cylinder;
   a plurality of ports communicating the cylinder with the reservoir;
   a return passage between the cylinder and the reservoir for returning fluid from the reservoir to the cylinder as the piston is restored to the neutral position; and
   a pressure relief valve in at least one of the ports for requiring an initial pressure differential between the reservoir and the cylinder before allowing fluid flow through said at least one of the ports from the cylinder to the reservoir while undergoing a buff shock when the piston is in the neutral position.

13. The shock absorber according to claim 10 wherein said elastomeric member comprises a sleeve encircling the shaft.

14. The shock absorber according to claim 10 wherein said elastomeric member comprises a sleeve encircling the shaft, the sleeve having a concave inner and outer surface while in an undeformed condition, the concave inner surface having portions spaced radially from the shaft.

15. The shock absorber according to claim 10 wherein said internal positioning spring comprises an elastomeric sleeve having an outer diameter that is less than an inner diameter of the cylinder while the spring is in an undeformed condition.

16. The shock absorber according to claim 10 wherein the spring is in a substantially undeformed condition while the piston and the cylinder are in the neutral position.

17. A method for absorbing buff and draft shock in a railcar, comprising:

(a) mounting to the railcar a cylinder which has a buff end and a draft end, a piston assembly including a piston carried in the cylinder and a piston shaft extending from the piston sealingly through the draft end of the cylinder, and an internal spring located between the piston and the draft end;

(b) placing in the cylinder a liquid and gas fluid under gas pressure;

(c) securing one of the piston shaft and the cylinder stationarily in a horizontal position to a frame of the railcar and the other of the piston shaft and the cylinder to a coupling for coupling to adjacent railcars;

(d) while free of buff and draft shock, restoring the piston and the draft end of the cylinder toward each other due to the gas pressure;

(e) engaging one end of the spring with the piston assembly and another end of the spring with the draft end of the cylinder, the spring having sufficient stiffness to stop further restoring movement of the piston and the draft end of the cylinder toward each other at a selected neutral position wherein the piston is spaced from the draft end of the cylinder;

(f) allowing the piston to move from the neutral position toward the draft end of the cylinder by deforming the ends of the spring toward each other if a draft shock occurs of sufficient magnitude while the piston and the cylinder are in the neutral position; and (g) allowing the piston and the draft end of the cylinder to move away from each other from the neutral position if a buff shock occurs of sufficient magnitude while the piston and the cylinder are in the neutral position.

18. The method according to claim 17, wherein step (e) comprises stopping the piston at a position wherein a face of the piston that faces the buff end of the cylinder is closer to the draft end than the buff end of the cylinder.

19. The method according to claim 17 wherein during step (g), the spring will not undergo any substantial elongation.

20. The method according to claim 17, wherein during step (e) the spring will be substantially in an undeformed condition while the piston and the cylinder are in the neutral position.

* * * * *